United States Patent
Krink et al.

(10) Patent No.: US 8,461,475 B2
(45) Date of Patent: Jun. 11, 2013

(54) SYSTEM FOR THE THERMAL PROCESSING OF WORKPIECES BY A PLASMA JET OR A LASER BEAM

(75) Inventors: Volker Krink, Finsterwalde (DE); Friedrich-Wilhelm Bach, Isernhagen (DE); Frank Laurisch, Finsterwalde (DE); Thomas Ruemenapp, Dresden (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 0 days.

(21) Appl. No.: 12/998,346

(22) PCT Filed: Oct. 23, 2009

(86) PCT No.: PCT/DE2009/001540
§ 371 (c)(1),
(2), (4) Date: Aug. 2, 2011

(87) PCT Pub. No.: WO2010/045943
PCT Pub. Date: Apr. 29, 2010

(65) Prior Publication Data
US 2012/0103946 A1    May 3, 2012

(30) Foreign Application Priority Data
Oct. 25, 2008    (DE) .................... 10 2008 056 278

(51) Int. Cl.
*B23K 10/00*    (2006.01)
*B23K 26/00*    (2006.01)
(52) U.S. Cl.
USPC ............ 219/121.39; 219/121.45; 219/121.48; 219/121.63

(58) Field of Classification Search
CPC ................................ B23K 10/00; B23K 26/00
USPC ............ 219/121.39, 121.44, 121.45, 121.46, 219/121.48, 121.63, 121.67, 121.7
See application file for complete search history.

(56) References Cited

U.S. PATENT DOCUMENTS

| | | | |
|---|---|---|---|
| 4,689,467 A * | 8/1987 | Inoue ......................... | 219/121.6 |
| 5,168,610 A | 12/1992 | Ichimura et al. .................. | 29/33 |
| 5,635,086 A * | 6/1997 | Warren et al. ............ | 219/121.39 |
| 6,236,013 B1 * | 5/2001 | Delzenne ................. | 219/121.54 |
| 6,291,795 B1 * | 9/2001 | Jones et al. ............. | 219/121.63 |
| 6,374,158 B1 | 4/2002 | Fusaro, Jr. .................... | 700/254 |
| 6,683,273 B2 * | 1/2004 | Conway et al. .......... | 219/121.51 |
| 7,960,669 B2 * | 6/2011 | Yamaguchi et al. ..... | 219/121.39 |
| 2005/0011866 A1 | 1/2005 | Faust et al. ............... | 219/121.54 |

FOREIGN PATENT DOCUMENTS

| | | |
|---|---|---|
| CN | 101001713 A | 7/2007 |
| CN | 201052570 Y | 4/2008 |
| DE | 4235592 | 1/1994 |
| DE | 19547033 | 6/1997 |
| EP | 0901867 A3 | 3/1999 |
| EP | 1125695 A2 | 8/2001 |
| GB | 1096820 | 12/1967 |
| JP | 7328879 | 12/1995 |
| JP | 200125873 | 1/2001 |

* cited by examiner

Primary Examiner — Mark Paschall
(74) Attorney, Agent, or Firm — Jacobson Holman PLLC

(57) ABSTRACT

A system for the thermal processing of workpieces. In this respect, workpieces can be processed by a plasma jet or by a laser beam. The thermal processing of workpieces is done more flexibly and also less expensive in this respect. A laser processing head or a plasma processing head can be connected by a single shaft element.

8 Claims, 8 Drawing Sheets

Figure 1:
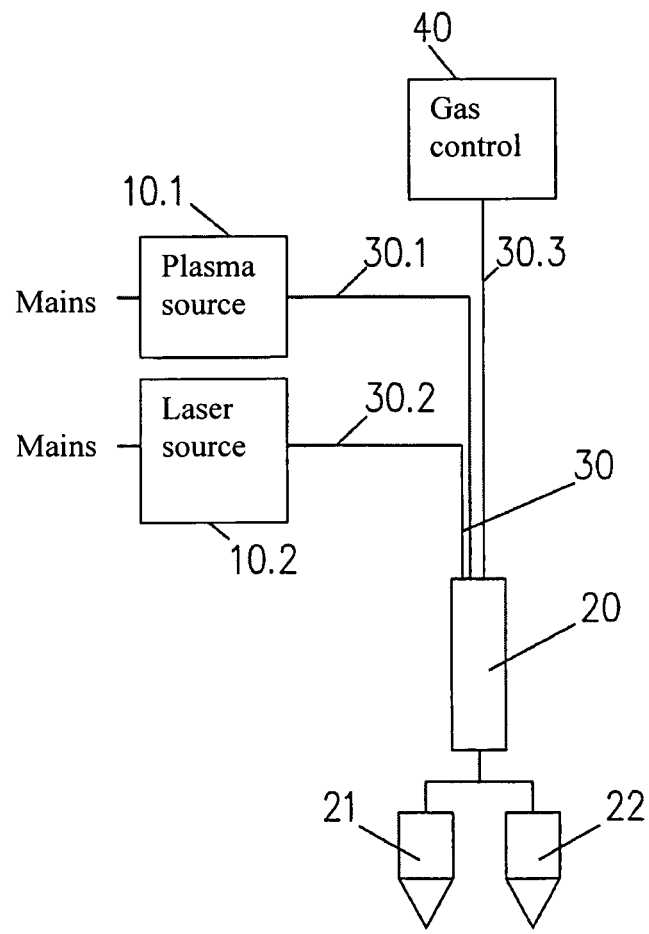

SYSTEM FOR THE THERMAL PROCESSING OF WORKPIECES BY A PLASMA JET OR A LASER BEAM

This is a national stage of PCT/DE09/001,540 filed Oct. 23, 2009 and published in German, which claims the priority of German number 10 2008 056 278.5 filed Oct. 25, 2008, hereby incorporated by reference.

BRIEF DESCRIPTION OF THE INVENTION

The invention relates to a system for the thermal processing of workpieces. In this respect, workpieces can be processed by a plasma jet or by a laser beam. The invention can preferably be used for separating processing, that is, for cutting, but also for welding workpieces.

BACKGROUND OF THE INVENTION

The processing with plasma is very productive and metallic workpieces can, for example, be economically separated in the thickness range 1 to 60 mm for construction steels and 1 to 160 mm for aluminum and CrNi steels. In this respect, a plasma is directed onto a workpiece to be processed by an arc which generates a highly heated and electrically conductive gas and restricted by a nozzle. The material is melted by means of the thermal and kinetic energy and is driven out of the kerf which is formed. The layer quality has been able to be considerably improved in the very recent past. Only the taking into account of filigree contours, that is, the taking into account of large changes in the feed axis direction with small diameters, presents problems. Holes with radii smaller than 5 mm or which are smaller than 1.5 times the thickness of a workpiece, can thus not be realized in high quality when cutting with plasma.

A processing with laser radiation achieves a better cutting quality when cutting in the lower workpiece thickness range (<10 mm). Smaller kerfs and sharp edges can be formed with very small radii. With larger workpiece thicknesses, the productivity is much smaller and a processing is no longer possible from a thickness of some centimeters onward.

When cutting, a processing using plasma is less expensive, faster and frequently has a higher quality from workpiece thicknesses of 5 mm upward.

With the introduction of fiber lasers into production, wherein the laser radiation is guided via optical waveguides, the beam guiding has been substantially simplified.

Both the plasma technique and the laser technique can each be used in automated form in conjunction with CNC controlled guide systems, e.g. coordinate guide systems or industrial robots. In this respect, an increased plant engineering effort and/or a further clamping of workpieces in a respectively different plant is/are necessary for the processing if both processing methods should be carried out on one workpiece.

SUMMARY OF THE INVENTION

It is therefore the object of the invention to make possible the thermal processing of workpieces more flexibly and also less expensive in this respect.

Technical elements can be made use of in the invention which are known per se, but which will be somewhat modified. Plasma processing heads and laser processing heads can thus be used whose basic structure corresponds to that previously used. In this respect, an adaptation, in particular for laser processing heads, can also take into account whether they should be used for welding or cutting since a supply of cutting gas/processing gas is necessary for the cutting which is required through a nozzle onto the workpiece for driving molten material out of the kerf.

Process gas is, however, also required for operating a plasma processing head. A common access of both components to a jointly usable gas supply can thereby be utilized in the invention.

A system in accordance with the invention is designed in this respect so that a laser processing head and a plasma processing head can be connected by a single shaft element. In this respect, at least one feed for the electric current to an electrode in the plasma processing head, an optical waveguide for laser radiation and a feed for process gas are preferably present in the shaft element. They can in each case be in communication with one another or be connected with one another by complementary connections or elements, which are present at the plasma processing head and at the laser processing head, in the state fastened to the shaft element. In this respect, the feeds are connected to a supply for electric current or a supply for process gas and the optical waveguide is connected to a laser light source.

The shaft element can be fastened to a guide system such as is known from the prior art. It is designed so that a plasma processing head and a laser processing head can be fastened thereto, but that an exchange of the different processing heads is possible simply and fast. This can be achieved with suitable quick-change closures. A replacement can thus be realized simply and fast on a change in the processing or when wear has occurred. In addition to the common guide system, a single workpiece clamping device, however, other contact components can also be used such as in particular a gas supply or also an additional cooling system for both processing kinds together which are present or may be present at the system in accordance with the invention. In this respect, a cooling system can be designed so that an additional cooling only takes place on a processing using plasma or using laser radiation. This will preferably be the processing using plasma. In this respect, the shaft element and the different processing heads can be designed accordingly so that a coolant can only flow into, and back out of one of the two different processing heads again.

A laser light source with smaller power is required since it is also possible to work with plasma when higher powers are required.

The most varied materials and workpieces having different thicknesses can be processed using the invention. The costs for plant engineering can be reduced and the productivity increased since the advantages of the two different processing methods can be utilized.

There is also the possibility of designing the process gas supply so that a secondary gas can also be supplied.

BRIEF DESCRIPTION OF THE INVENTION

The invention will be explained in more detail in the following with reference to examples.

Figure 2:
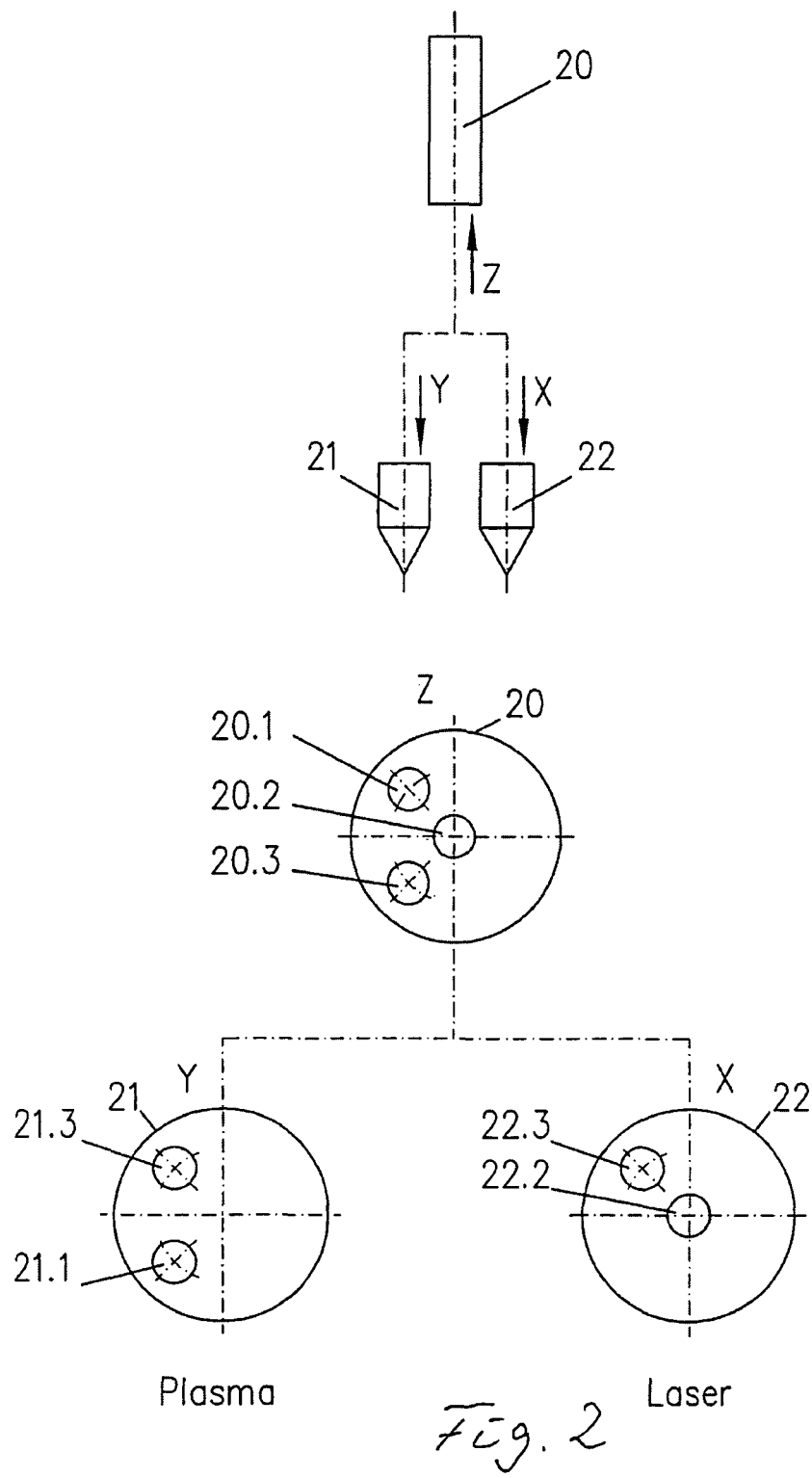
Figure 3:
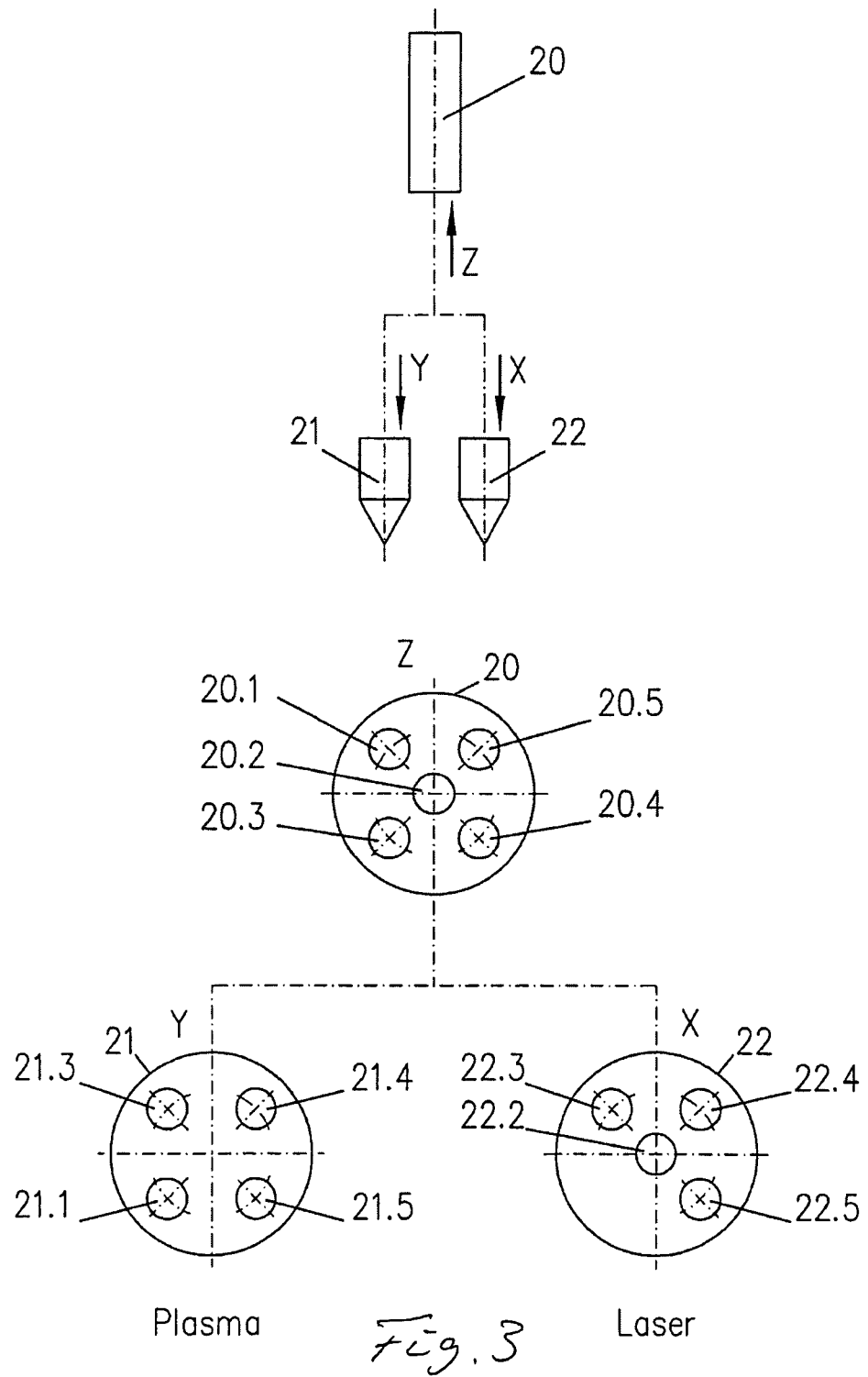
Figure 4:
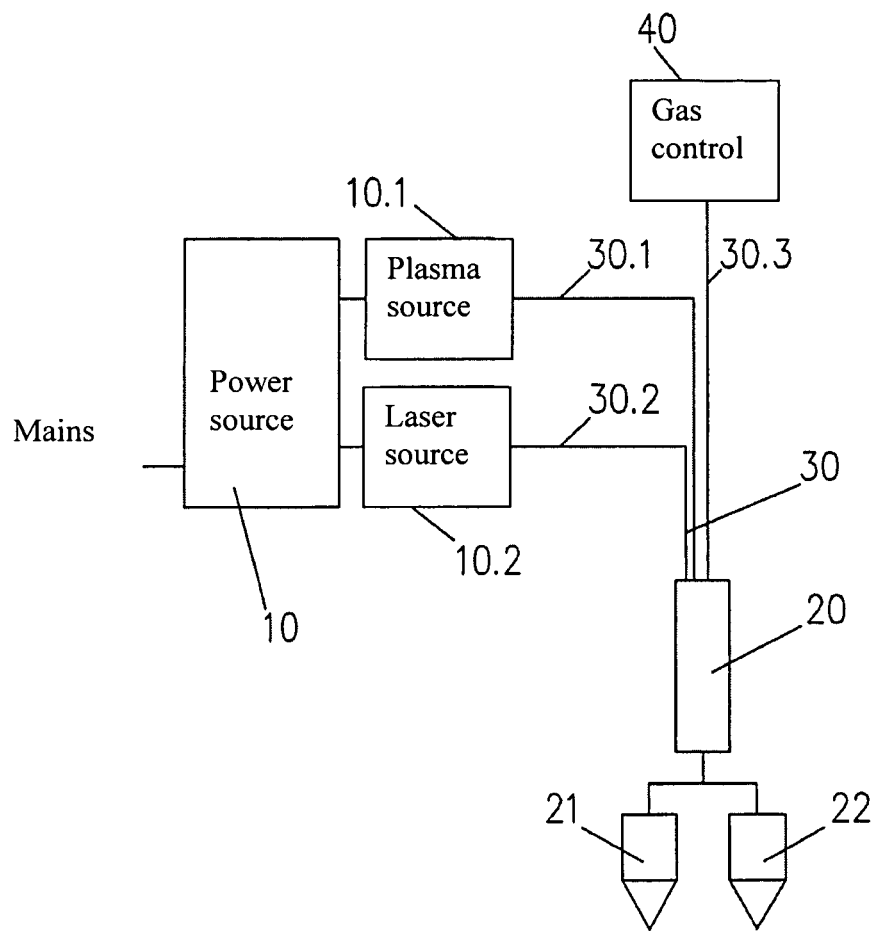
Figure 5:
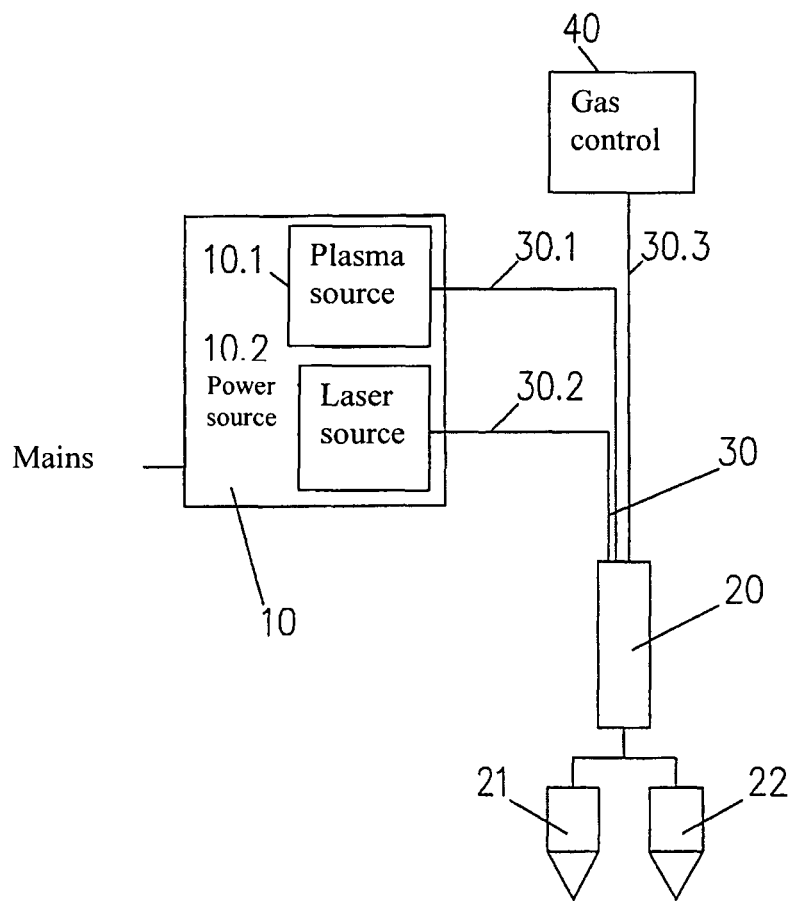
Figure 6:
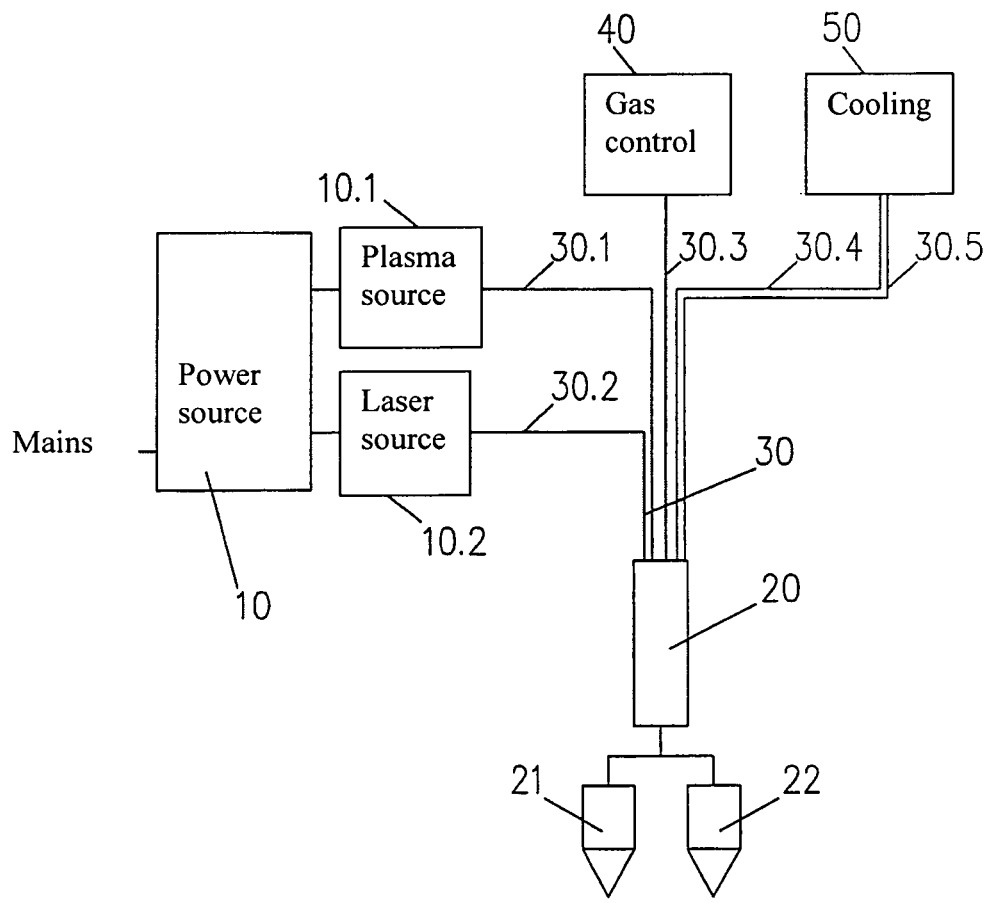
Figure 7:
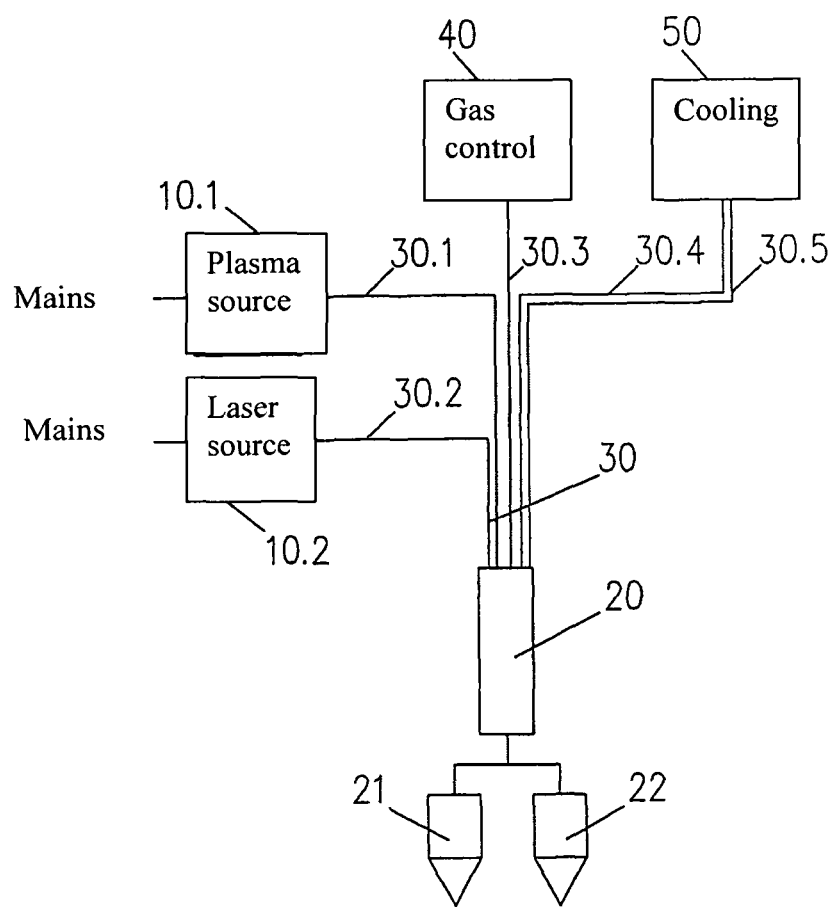
Figure 8:
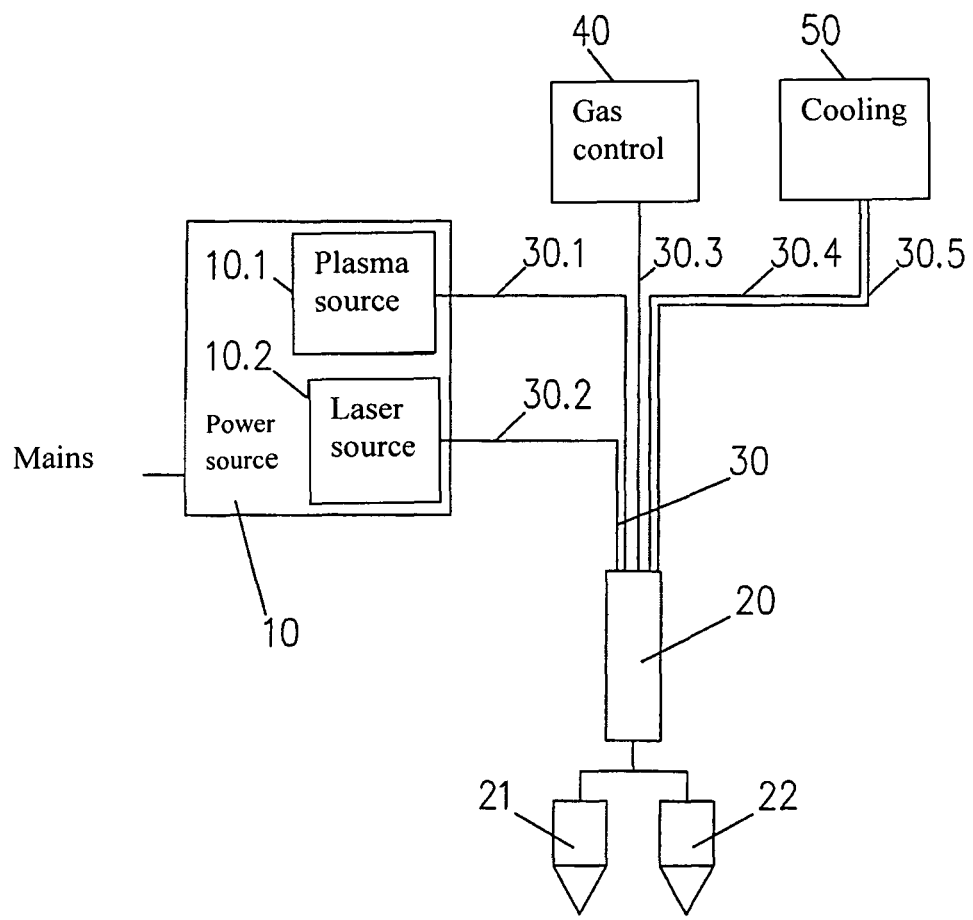

There are shown:

FIG. 1 in schematic form, the structure of an example of a system in accordance with the invention;

FIG. 2 options for the design of a shaft element, of a plasma processing head and of a laser processing head without cooling;

FIG. 3 options for the design of a shaft element, of a plasma processing head and of a laser processing head with cooling;

FIG. 4 in schematic form, the structure of a further example of a system in accordance with the invention;

FIG. 5 in schematic form, the structure of a further example of a system in accordance with the invention;

FIG. 6 in schematic form, the structure of a further example of a system in accordance with the invention;

FIG. 7 in schematic form, the structure of a further example of a system in accordance with the invention; and FIG. 8 in schematic form, the structure of a further example of a system in accordance with the invention.

DETAILED DESCRIPTION OF THE PREFERRED EMBODIMENTS

A simple example of a system in accordance with the invention without additional cooling will be illustrated by FIG. 1 in schematic form.

In this respect, a plasma source 10.1 and a fiber laser as a laser light source 10.2 are connected to an electric power supply (mains). A shaft element 20 is connected via feeds 30.1 to a plasma source 10.1 via which an electrode, not shown, present in a plasma processing head 21 can be supplied with electric power. Emitted laser radiation reaches the shaft element 20 via an optical waveguide 30.2. Process gas is supplied by a gas control 40 via the line 30.3. A common hose or line packet 30 can be formed with the lines 30.1, 30.2 and 30.3.

A plasma processing head 21 or a laser processing head 22 can selectively be fastened to the shaft element 20. In this respect, in a system designed in this manner, the process gas control and the process gas management can be used jointly in both processes. Only the respective required process gas pressures and process gas volume flows have to be taken into account.

Possible embodiments of the shaft element 20, of the plasma processing head 21 and of the laser processing head 22 such as can be used in a system in accordance with FIG. 1 or a system without cooling should be illustrated by FIG. 2.

In this respect, the upper representation reproduces the three components 20, 21 and 22. In the middle, a view is shown, marked by Z, from below and from the side respectively of the shaft element 20 to which the plasma processing head 21 and the laser processing head 22 can be fastened.

The optical waveguide 20.2 for the laser radiation is guided through the middle longitudinal axle. In addition, the feed 20.1 for electric current for the plasma operation and the feed 20.3 of process gas through the shaft element 20 to the processing heads 21 and 22 are formed.

Views from the side of the two processing heads 21 and 22, at which side they can be connected to the shaft element 20, are shown at the bottom left and bottom right. In this respect, the optical waveguide 22.2, and the feeds 21.1 and 21.3 are arranged and aligned so that a connection can be ensured and the respective media can be conducted through them to the respective processing head 21 or 22.

The representation of FIG. 3 corresponds in substantial points to FIG. 2. However, modified processing heads 21 and 22 and a modified shaft element 20 are shown such as can be used in the systems shown in the following with respect to FIGS. 6 to 8 since here an additional cooling is provided.

The same elements are provided with the same reference numerals. In this example, there are present in the shaft element 20 shown in the middle, a feed 20.4 and a return line 20.5 for a coolant can be guided through the shaft element 20 into the respective processing head 21 or 22 and back again to a cooling system 50 which can be preferably designed as a return cooling system. The wear in operation can be reduced by a cooling.

The feed 20.4 can open into the coolant line 21.4 of the plasma processing head 21 or into the coolant line 22.4 of the laser processing head 22 and the return 20.5 into the coolant lines 21.5 or 22.5 of the respective processing head 21 or 22 respectively fastened to the shaft element 20.

There is also the possibility of forming and associating a feed 20.1, 21.1 for electric current so that it can be conducted within a passage or a feed or return line 20.4, 21.4, 20.5 or 21.5 for coolant and can be cooled in so doing. The cross-section of a used electric conductor can be reduced by a cooling over comparable electric currents flowing through it without cooling.

The further embodiments of the two processing heads 21 and 22 are not shown. They can be designed as usual. That is, the electrodes and nozzles can be arranged or present accordingly at the plasma processing head 21.

At the laser processing head 22, an optical element focusing on or forming the laser beam directed onto the workpiece can be present. Said laser processing head can also be provided with a cutting nozzle if a cutting is intended to be carried out on workpieces.

A system in accordance with the invention can also be further developed so that what type of processing head 21 or 22 is fastened to the shaft element 20 at the time can be detected automatically so that this can be taken into account for the control or regulation of the processing process and incorrect operations can be avoided. For this purpose, a sensitive element can be present which is arranged at the shaft element 20 and/or at the different processing heads 21 or 22. This is connected for the identification to an electronic control so that an automated, safe operation can be carried out in accordance with the respective processing procedure to be carried out. A sensitive element can e.g. be a switch contact. In a simple embodiment, a switchover of a common power source 10 of the plasma source 10.1 to the laser light source 10.2, or vice versa, can be carried out in this respect.

The example shown in FIG. 4 only differs from the example of FIG. 1 in that the plasma source 10.1 and the laser light source 10.2 are jointly connected to an electric power source 10 by which the power can be influenced. In the example shown in FIG. 5, the plasma source 10.1, the laser light source 10.2 and the energy source 10 are formed as an integrated unit. The use of a common power source 10 or energy supply is likewise inexpensive and therefore advantageous.

The examples shown in FIGS. 6 to 8 have an additional cooling 50 with the feed line 30.4 and the return line 30.5 for a coolant to the shaft element 20 with the respective processing head 21 and 22 and from there back to the cooling 50. Except for the additional cooling 50 with the lines 30.4 and 30.5, the example in accordance with FIG. 6 corresponds to the example shown in FIG. 4. This applies analogously to the example of FIG. 1 for the example shown in FIG. 7 and to the example of FIG. 5 without cooling 50 for the example of FIG. 8.

The invention claimed is:

1. A system for the thermal processing of workpieces using a plasma jet or a laser beam, said system comprising
a laser processing head and a plasma processing head being selectively connected to a single shaft element, the plasma processing head and the laser processing head being designed for separate processing or welding of workpieces,
at least one feed for electric current to an electrode in the plasma processing head, an optical waveguide for laser radiation and a feed for process gas being present in the single shaft element and respectively communicating or connecting by complementary connections or elements present in the plasma processing head and in the laser processing head when fastened to the single shaft element;

the feeds for electric current and for process gas being respectively connected to a supply for electric current and a supply for process gas, and the optical waveguide being connected to a laser light source.

2. The system in accordance with claim 1, wherein the plasma processing head and the laser processing head are fastenable to the shaft element by at least one quick-change closure.

3. The system in accordance with claim 1, wherein laser radiation emitted by the laser light source is transmitted by optical waveguides.

4. The system in accordance with claim 1, wherein the laser light source is a fiber laser.

5. The system in accordance with claim 1, wherein a feed and a return line for a coolant are formed through the single shaft element and are connected to coolant lines in the laser processing head or in the plasma processing head.

6. The system in accordance with claim 5, wherein at least one feed line for electric current to an electrode of the plasma processing head is arranged within the feed or the return line in the single shaft element and a coolant line in the plasma processing head.

7. The system in accordance with claim 1, wherein a sensitive element is present at at least one of the single shaft element, at the plasma processing head and the laser processing head which is connected to an electronic control for identification of a respective processing head fastened to the single shaft element.

8. The system in accordance with claim 1, wherein a plasma source and the laser light source are connected to a common current source.

* * * * *

UNITED STATES PATENT AND TRADEMARK OFFICE
CERTIFICATE OF CORRECTION

PATENT NO. : 8,461,475 B2
APPLICATION NO. : 12/998346
DATED : June 11, 2013
INVENTOR(S) : Krink et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this
Eighth Day of September, 2015

Michelle K. Lee
*Director of the United States Patent and Trademark Office*